United States Patent
Farrell et al.

(10) Patent No.: US 8,151,061 B2
(45) Date of Patent: Apr. 3, 2012

(54) ENSURING COHERENCE BETWEEN GRAPHICS AND DISPLAY DOMAINS

(75) Inventors: Robert L. Farrell, Granite Bay, CA (US); Michael J. Muchnick, Fair Oaks, CA (US); Altug Koker, El Dorado Hills, CA (US); Zeev Offen, Haifa (IL); Ariel Berkovits, Yuvalim (IL)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 12/401,499

(22) Filed: Mar. 10, 2009

(65) Prior Publication Data

US 2010/0235320 A1     Sep. 16, 2010

(51) Int. Cl.
*G06F 13/00* (2006.01)
(52) U.S. Cl. ............ 711/143; 711/1; 711/117; 365/49.1
(58) Field of Classification Search ........................ None
See application file for complete search history.

(56) References Cited

U.S. PATENT DOCUMENTS

| | | | |
|---|---|---|---|
| 5,297,269 A * | 3/1994 | Donaldson et al. ........... | 711/145 |
| 5,886,706 A * | 3/1999 | Alcorn et al. ................. | 345/582 |
| 5,941,968 A * | 8/1999 | Mergard et al. ............... | 710/308 |
| 6,078,339 A * | 6/2000 | Meinerth et al. .............. | 345/522 |
| 6,222,564 B1 * | 4/2001 | Sturges ......................... | 345/531 |
| 6,483,516 B1 * | 11/2002 | Tischler ........................ | 345/552 |
| 6,819,543 B2 * | 11/2004 | Vieweg et al. ............ | 361/306.3 |
| 6,891,543 B2 * | 5/2005 | Wyatt ............................ | 345/541 |
| 7,719,540 B2 * | 5/2010 | Piazza et al. .................. | 345/557 |
| 7,796,135 B1 * | 9/2010 | Diard et al. ................... | 345/502 |
| 7,814,279 B2 * | 10/2010 | Clark et al. ................... | 711/141 |

* cited by examiner

*Primary Examiner* — Hung Le
(74) *Attorney, Agent, or Firm* — Blakely, Sokoloff, Taylor & Zafman LLP

(57) ABSTRACT

A platform may comprise a core coherency domain, graphics coherency domain and a non-coherent domain. A graphics acceleration unit (GAU) of the graphics coherency domain may generate data units from an application and the data units may comprise display data units. The GAU may annotate the display data units with an annotation value before flushing the display data units to an on-die cache. The GAU may identify modified display data units among the display data units stored in the on-die cache and issue flush commands to cause flushing of the modified display data units from the on-die cache to a main memory. The display engine of the non-coherent domain may use the modified display data units stored in the main memory to render a display on a display device.

22 Claims, 5 Drawing Sheets

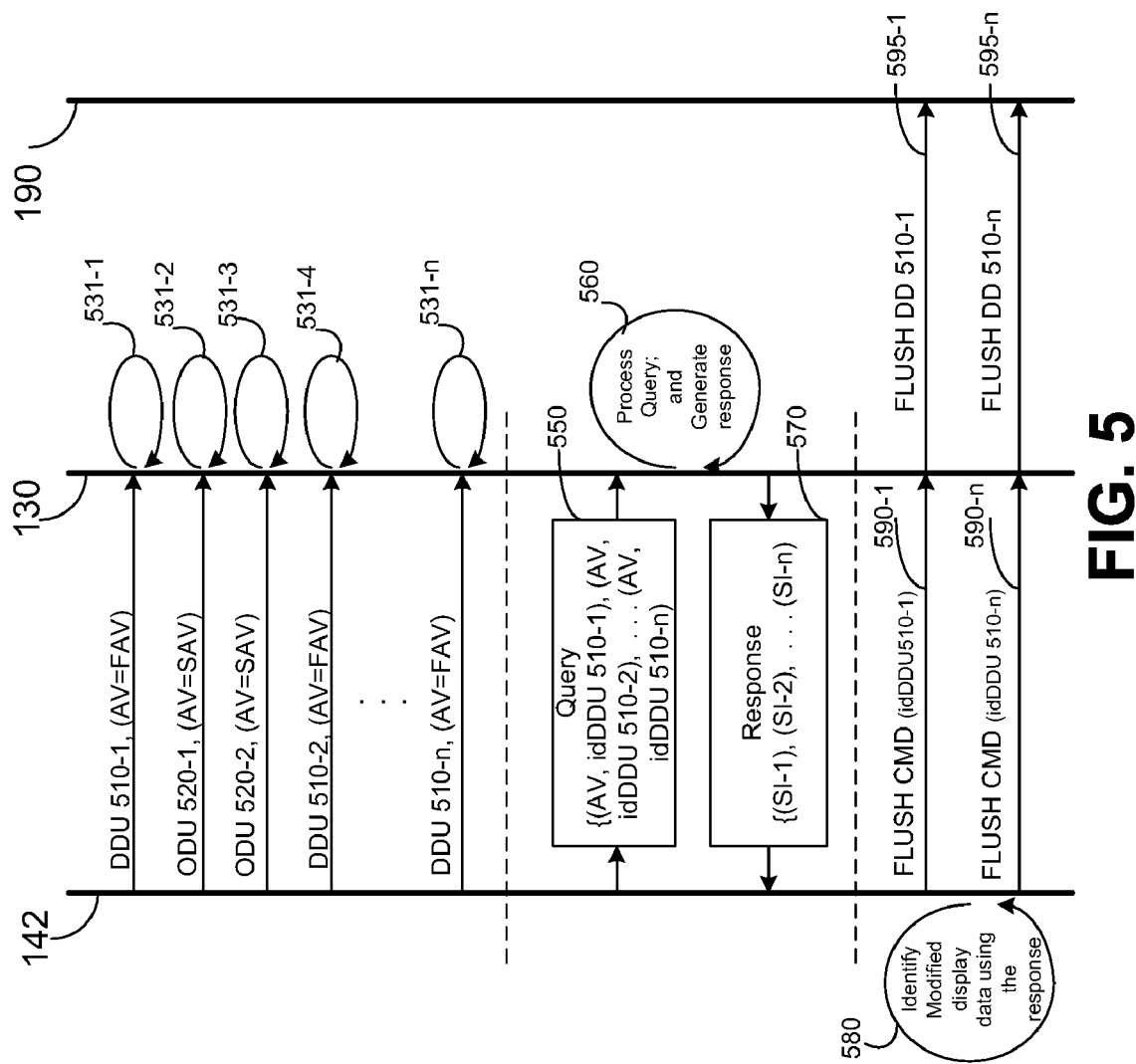

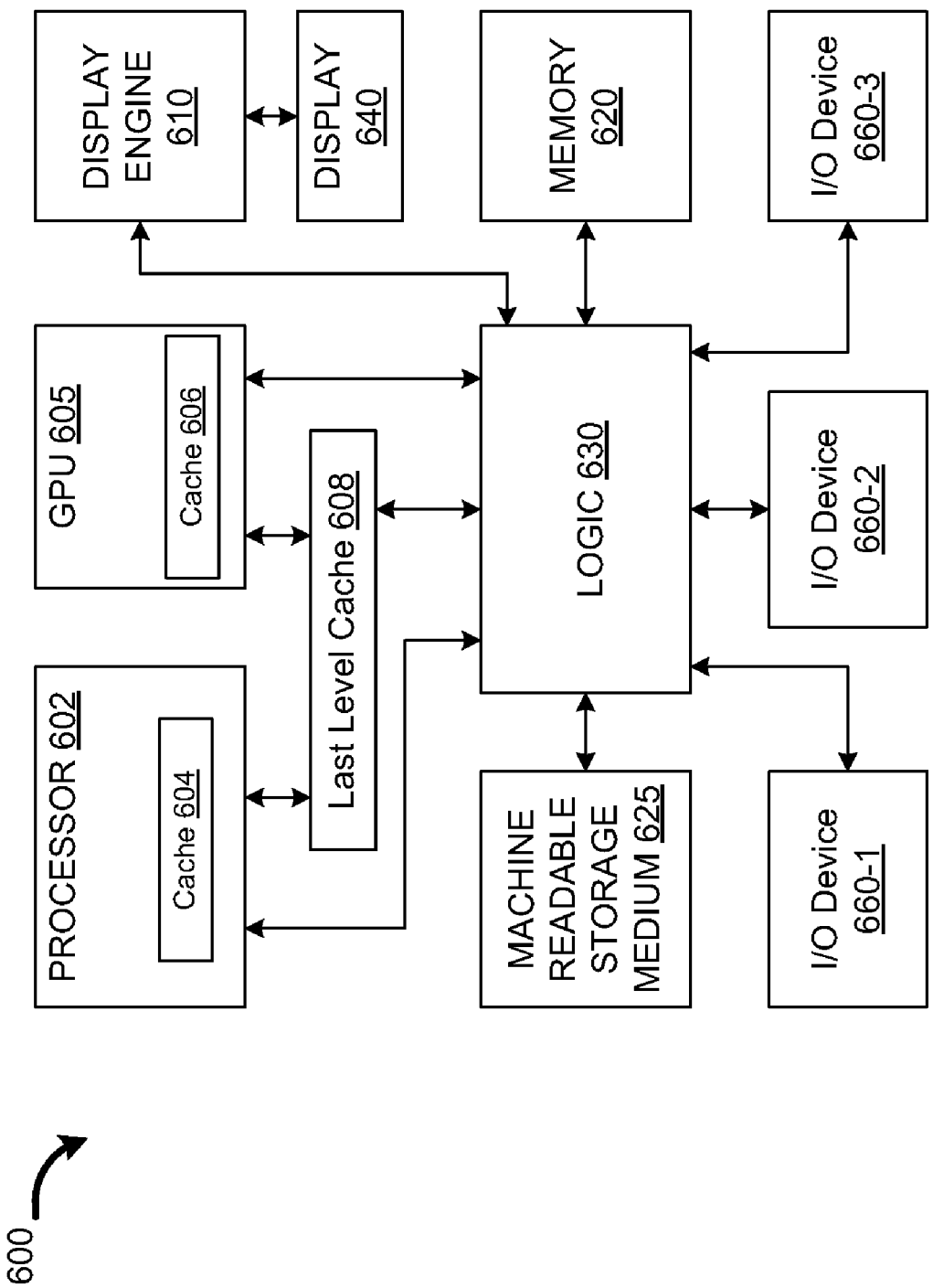

US 8,151,061 B2

ENSURING COHERENCE BETWEEN GRAPHICS AND DISPLAY DOMAINS

BACKGROUND

Progress in the silicon process technology has enabled provisioning of significantly large on-die caches causing a close proximity of the cache to the processing devices. Current processing devices such as graphics devices may ensure coherency by flushing the contents of the on-die caches to a main memory before the display engine uses the contents of the main memory to render a display on a display device. The display engine may retrieve the contents (display data units) from the main memory and may, isochronously, provide the display data units to the display device without snooping into the on-die caches. Flushing such large on-die caches to ensure coherency may consume resources such as processor cycles, bus bandwidth, memory bandwidth, and such other similar resources. Also, much of the non display data units stored in the on-die cache may also be flushed to the main memory and such non display data units may not be required by the display engine for rendering display on the display device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates a flow diagram 500, which depicts the signaling process and transfer of display data between the components of the platform 100 to ensure coherency between the graphics and display domain according to one embodiment.

FIG. 6 illustrates a system 600 to ensure coherency between the graphics and display domain according to one embodiment.

DETAILED DESCRIPTION

The following description describes embodiments of a technique to ensure coherence between the graphics and display domain. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
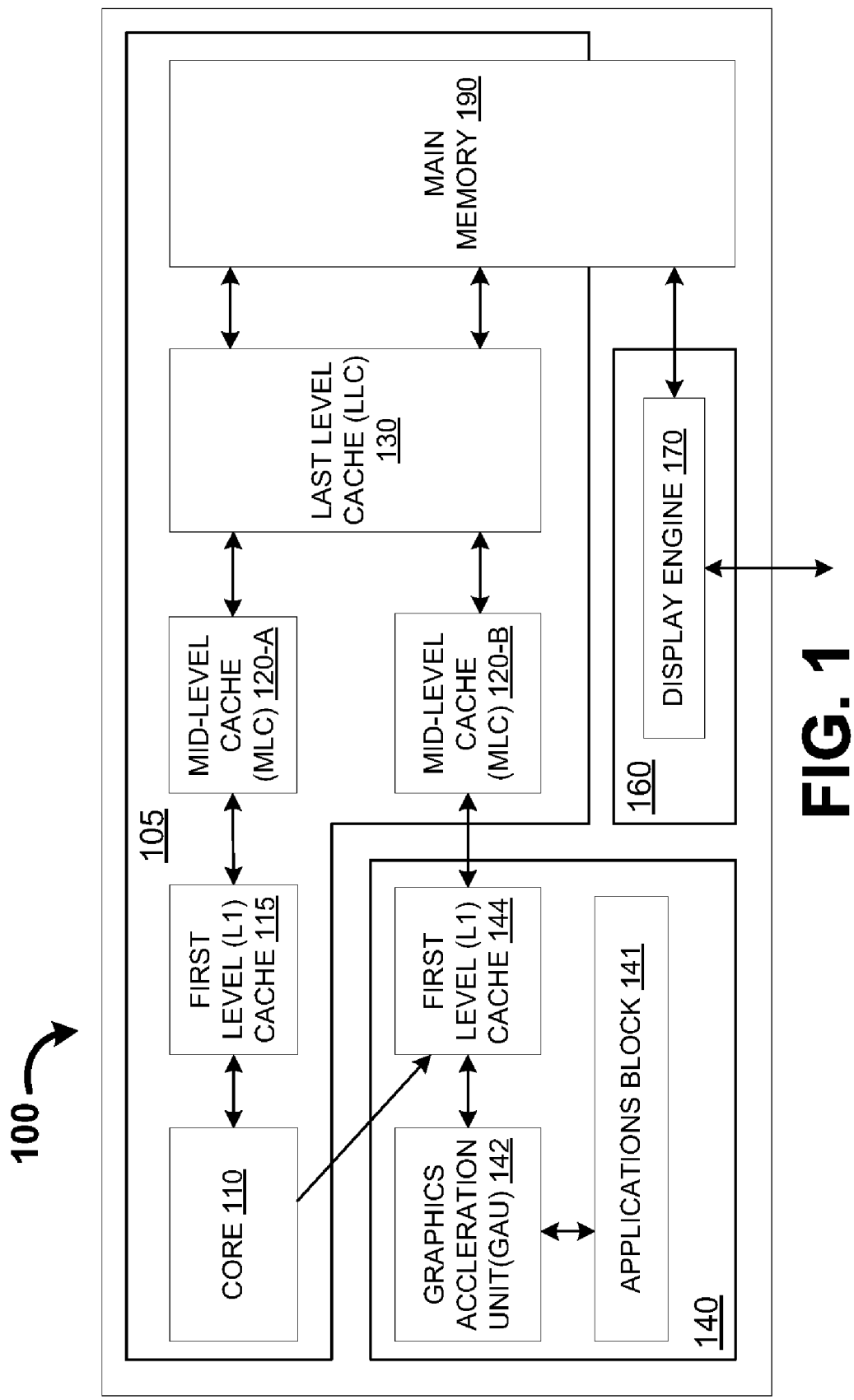
FIG. 1 illustrates a platform 100, which includes a technique to ensure coherency between graphics and display domain according to one embodiment.

An embodiment of a platform 100, which may support a technique to ensure coherency between graphics and display domain is illustrated in FIG. 1. In one embodiment, the platform 100 may comprise a core coherency domain 105, graphics coherency domain 140, and non-coherency domain 160. In one embodiment, the coherency domain 105 may represent a core coherency domain, which may comprise one or more cores 110, a first level cache 115 associated with the core 110, a mid-level cache (MLC) 120-A and 120-B, and a last level cache (LLC) 130. In one embodiment, the core 110 may process data by retrieving instructions and data, which may be stored in the first level cache 115, or the MLC 120-A, or the LLC 130, or the main memory 190.

In one embodiment, the core 110 may store the processed data in the first level cache 115 and thereafter the data may be flushed to MLC 120-A, LLC 130, and the main memory 190 based on, for example a least recently used (LRU) policy and such other similar policies. In one embodiment, the core coherency domain 105 may represent a coherent domain, which may adopt coherency protocols and ordering rules to maintain coherency. In one embodiment, the core coherency domain 105 may use Modified-Exclusive-Shared-Invalid (MESI) cache coherency techniques and such other similar techniques and ordering rules such as strong ordering or weak ordering to maintain coherency.

In one embodiment, the graphics coherency domain 140 may comprise an applications block 141, a graphics acceleration unit (GAU) 142, and a first level cache 144 associated with the GAU 142. In one embodiment, the GAU 142 may generate data units after processing one or more applications of the applications block 141. In one embodiment, the GAU 142 may annotate some of the data units (referred to as 'display data units' hereafter) with a first annotation value (FAV) that may be used by the display engine 170 for generating display on a display device. In one embodiment, the GAU 142 may annotate the remaining (other than the display data units) data units (referred to as 'other data units' hereafter) with a second annotation value (SAV) to differentiate the other data units (ODUs) from the display data units (DDUs). In one embodiment, the other data units ODUs may not be used by the display engine 170 while generating display on a display device. In other embodiment, the GAU 142 may annotate some data units with an annotation value and may not annotate the remaining data units.

In one embodiment, the GAU 142 may flush the display data units DDUs along with the first annotation value (FAV) and the other data units ODUs along with the second annotation value (SAV) to the last level cache (LLC) 130. In one embodiment, the GAU 142 may generate a query, which may be used to identify the display data units that are modified and stored in the LLC 130. In one embodiment, the GAU 142 may generate a query, which may comprise identifiers of the display data units and annotation value associated with the display data units. In one embodiment, the GAU 142 may receive a response comprising status information, which may identify the display data units that are modified ('modified display data units' hereafter). In one embodiment, the GAU 142 may issue flush commands to the LLC 130, which may cause the modified display data units (MDDUs) to be flushed to the main memory 190. In one embodiment, the graphics coherence domain 140 may use a buffer coherency protocol in which memory buffer is coherent at specific time points such as end of execution.

Such an approach may allow the modified display data units to be flushed to the main memory 190 compared to flushing the entire or substantially entire contents of the on-die caches such as the FLC 144 and MLC 120-B and LLC 130 without identifying the type of the data units. In one embodiment, identifying the display data units and flushing such identified display units to the main memory 190 may conserve the processor resources, bus bandwidth, and memory bandwidth as well. In one embodiment, conserving the processor resources and memory bandwidth may also conserve power consumed by the platform 100.

In one embodiment, the last level cache 130 may store the display data units (DDUs) flushed from the first level cache 144 and mid-level cache 120-B. In one embodiment, the last level cache 130 may maintain the first annotation value associated with the display data units while storing the DDUs. In one embodiment, the last level cache 130 may also store the (ODUs) flushed from the first level cache 144 and mid-level cache 120-B. In one embodiment, the last level cache 130 may maintain the second annotation value associated with the ODUs while storing the ODUs. In one embodiment, the LLC 130 may receive ODUs associated with second annotation value if the GAU 142 chooses to annotate the remaining data units. In one embodiment, the LLC 130 may store the DDUs and the associated first annotation value (FAV) in the ways of one or more cache lines. In one embodiment, the last level cache 130 may determine a state of the DDUs and mark the DDUs with an appropriate state such as a Modified state (M), or Extended state (E), or Shared state (S), or Invalid state (I) using a MESI protocol.

In one embodiment, the last level cache 130 may generate a response after receiving a query from the GAU 142. In one embodiment, the response may indicate the state of the cache line that stores the DDUs indicated in the query. In one embodiment, the last level cache 130 may check the state of the ways comprising the DDUs identified by the DDU identifiers in the query before generating the response. In one embodiment, the LLC 130 may generate a response, which may comprise status information for each DDU identifier indicated in the query. In one embodiment, the status information may indicate whether the DDU is a modified DDU (MDDU). In one embodiment, last level cache 130 may support atomic transactions to handle processing of a query and generating of a response. In one embodiment, the atomic transactions may either occur completely or may not have any effect.

In one embodiment, the last level cache 130 may receive flush commands from the GAU 142 and may flush the display data units indicated by the flush commands. In one embodiment, the flush command may be an atomic transaction as well. In one embodiment, the last level cache 130 may receive flush commands for the modified display data units (MDDU) and the last level cache 130 may flush the modified display data units (MDDU) to the main memory 190.

In one embodiment, the display engine 170 may operate in a non-coherent domain and may not snoop the on-die caches such as the first level caches (L1) 115 and 144, the mid-level caches (MLC) 120-A and 120-B, and the LLC 130. In one embodiment, the display engine 170 may retrieve data units stored in, for example, a display area of the main memory 190 and may display the data units on a display unit such as a liquid crystal display (LCD).

Figure 2:
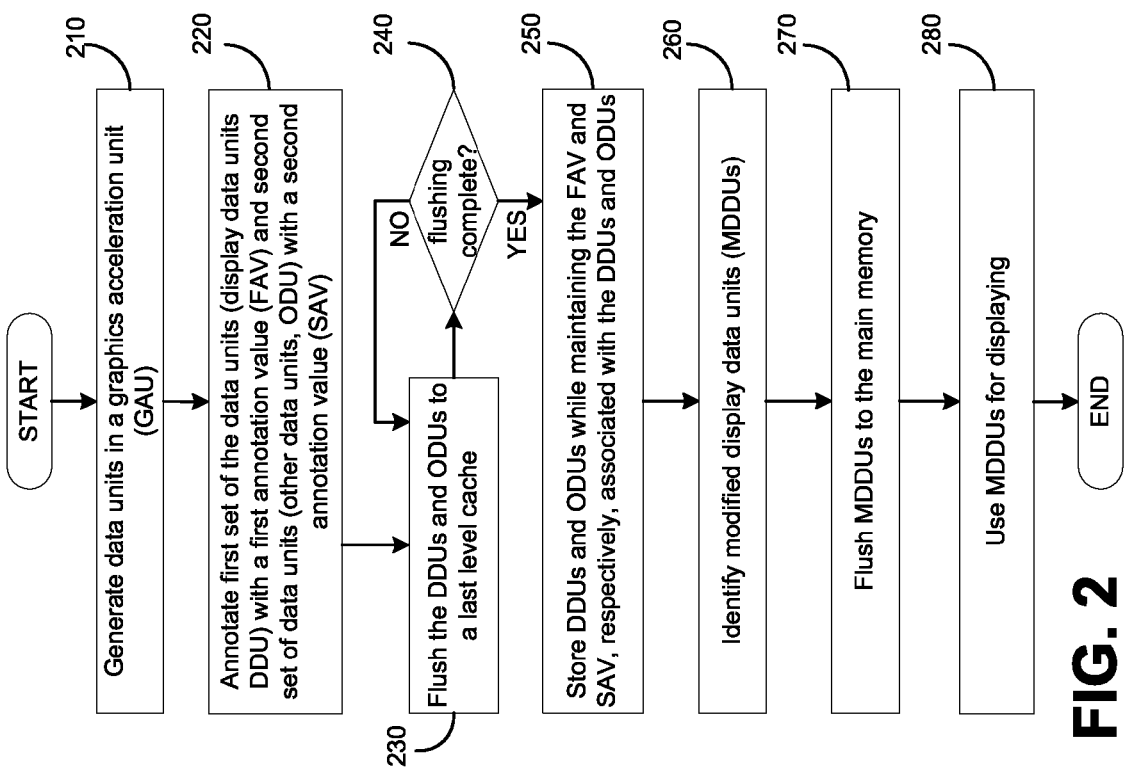
FIG. 2 is a flow-chart illustrating a technique to ensure coherency between graphics and display domain according to one embodiment.

An embodiment of the operation of the platform 100 to ensure coherency between the graphics domain 140 and the display domain 160 is illustrated in flow-chart of FIG. 2. In block 210, the GAU 142 may generate one or more data units, for example, in response to processing the application 141.

In block 220, the GAU 142 may annotate a first set of data units (display data units, DDU) with a first annotation value (FAV). In one embodiment, the GAU 142 may choose to annotate the remaining data units (other data units, ODUs) with a second annotation value (SAV). In one embodiment, the GAU 142 may annotate the ODUs with a SAV to differentiate the DDUs from the ODUs.

In block 230, the GAU 142 may flush the DDUs to the last level cache 130. In one embodiment, the GAU 142 may also flush ODUs to the LLC 130 if the remaining data units are annotated. In block 240, the GAU 142 may check if the flushing of DDUs and ODUs are completed and control passes to block 250 if the flushing is complete and to block 230 if the flushing is not complete.

In block 250, the last level cache 130 may store the DDUs in ways of cache lines while maintaining the FAV associated with DDUs. Also, the last level cache 130 may store the ODUs in ways of cache lines while maintaining the SAV associated with ODUs.

In block 260, the GAU 142 may identify the modified display data units (MDDUs). In one embodiment, the GAU 142 may send a query comprising identifiers of the DDUs and the annotation values associated with DDUs. In one embodiment, the GAU 142 may receive response from the LLC 130 after sending the query. In one embodiment, the response may comprise the status information for each of the DDUs identified by the DDU identifiers of the query. In one embodiment, the GAU 142 may identify the DDUs that are modified (MDDUs) based on the status information embedded in the response.

In block 270, the GAU 142 may cause the MDDUs to be flushed to the main memory 190. In one embodiment, the GAU 142 may issue flush commands that may comprise identifiers of the MDDUs that may be flushed. In one embodiment, the flush commands may be used by the LLC 130 to flush the MDDUs to the main memory 190.

In block 280, the display engine 170 may retrieve the MDDUs stored in the main memory 190 and use the MDDUs for rendering a display on a display device.

Figure 3:
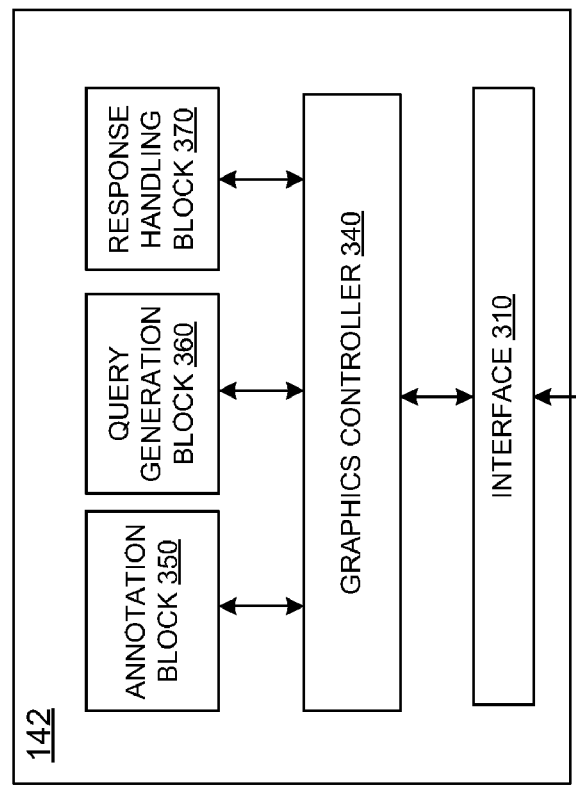
FIG. 3 illustrates a graphics acceleration unit (GAU) 142, which is to render display data units according to one embodiment.

An embodiment of the graphics acceleration unit (GAU 142), which may perform tasks to ensure coherency between the graphics coherent domain 140 and the display domain 160 is illustrated in FIG. 3. In one embodiment, the GAU 142 may comprise a graphics interface 310, a graphics controller 340, an annotation block 350, a query generation block 360, and a response handling block 370.

In one embodiment, the graphics interface 310 may couple the GAU 142 to the first level cache 144 and the applications block 141. In one embodiment, the graphics interface 310 may provide electrical, physical, and protocol interface between the GAU 142 and the first level cache 144 and the applications block 141.

In one embodiment, the graphics controller 340 may generate a start execution signal to initiate the applications of the applications block 141. In one embodiment, the graphics controller 340 may store the data units, which may be generated by the applications block 141 in the first level cache 144. In one embodiment, the graphics controller 340 may receive an execution complete signal from the applications block 141 that may indicate the completion of the execution of the application.

After receiving the execution complete signal, in one embodiment, the graphics controller 340 may send a first control signal to the annotation block 350 after the applications block 141 completes generating data units. In other embodiment, the graphics controller may send a first control signal to the annotation block 350 after generation of each data unit or a group of data units. In one embodiment, the first control signal generated by the graphics controller 340 may also indicate the type of data units generated by the application block 141. In one embodiment, the first control signal may comprise a type field, which may be configured as a first type or a second type based on the type of data units. For example, the type field for the data units, which may be used by the graphics engine 170 for generating display, may be configured as first type and that of the remaining data units may be configured as second type.

In one embodiment, the graphics controller 340 may retrieve the data units from the first level cache 144 after receiving a ready signal from the annotation block 350 and may pass the data units to the annotation block 350. In one embodiment, the GAU 142 may receive an annotation complete signal after sending the data units. In one embodiment, the graphics controller 340 may receive the annotated data units and store the annotated data units (DDUs and ODUs) into the first level cache 144. In one embodiment, the graphics controller 340 may receive the annotation complete signal from the annotation block 350 that may indicate completion of the annotation process.

After the annotation process is complete, in one embodiment, the graphics controller 340 may flush the display data units from the first level cache 144 to the last level cache 130. After flushing the contents of the first level cache 144, the graphics controller 340 may send a second control signal to the query generation block 360. In one embodiment, the graphics controller 340 may receive one or more queries in response to sending the second control signal and may forward the queries to the last level cache 130. In one embodiment, the graphics controller 340 may receive one or more responses to the queries from the last level cache 130 and may route the response to the response handling block 370. In one embodiment, the graphics controller 340 may maintain a table to ensure that responses are received for each of the queries sent.

In one embodiment, the graphics controller 340 may generate flush commands based on the input values received from the response handling block 370. In one embodiment, the input values may provide the identifiers of the display data units, which may be flushed from the last level cache 130 to the main memory 190. In one embodiment, the flush commands may be sent to the last level cache 130.

In one embodiment, the annotation block 350 may send the ready signal to the graphics controller 340 to start the annotation process and may receive the data units stored in the first level cache 144. In one embodiment, the annotation block 350 may annotate the data units with a first annotation value or a second annotation value based on the type value of the type field of the first control signal. In one embodiment, the annotation block 350 may annotate the data units with the first annotation value if the type value of the type field equals a first logic value and with the second annotation value if the type value of the type field equals a second logic value. In one embodiment, the annotation block 350 may annotate the data units either with a first or a second annotation value in response to receiving the first control signal. In other embodiment, the annotation block 350 may examine the contents of the data units and determine whether the data unit is of first type or second type.

In one embodiment, the annotation block 350 may annotate the data units (of first type), which may be used by the display engine 170 with the first annotation value and store the display data units DDUs in the first level cache 144. In one embodiment, the annotation block 350 may annotate the data units (of second type), which may not be used by the display engine 170 with the second annotation value and store the other data units ODUs in the first level cache 144. In one embodiment, the annotation block 350 may send the annotation complete signal to the graphics controller 340 to indicate the completion of annotation process.

In one embodiment, the query generation block 360 may generate one or more queries after receiving the second control signal. In one embodiment, the queries may comprise an annotation value field and a data unit identifier field. In one embodiment, the annotation field value may be configured either with a first annotation value or a second annotation value and the data unit identifier field may comprise identifiers that identify the data units, which may be checked to determine if the data units represent modified display data units.

In one embodiment, the response handling block 370 may receive responses and may identify the data units, which may be modified display data units. In one embodiment, the response may comprise status information for each data unit identifier in the query that may indicate whether the data unit is a modified display data unit. In one embodiment, the status information may comprise a bit, which may equal a first logic value if the data unit is a modified display data unit and may equal a second logic value if the data unit is not a modified display data unit. In one embodiment, the response handling block 370 may provide the identifiers of the modified display data units as the input values to the graphics controller 340.

In one embodiment, the last level cache LLC 130 may comprise an LLC interface 410, a cache control logic 440, an annotation comparator 460, a cache line selector 470, and a memory 480. In one embodiment, the LLC interface 410 may couple the LLC 130 to the GAU 142 and the main memory 190. In one embodiment, the LLC interface 410 may provide electrical, physical, and protocol interface between the LLC 130 and the GAU 142 and the main memory 190.

In one embodiment, the cache control logic 440 may receive annotated data units (DDUs and ODUs) and store the DDUs and ODUs in the memory 480. In one embodiment, the cache control logic 440 may maintain the annotation values associated with the data units. In one embodiment, the cache control logic 440 may determine the status of the data units and may store the status of the data units. In one embodiment, the status of the data units may be determined based on MESI protocol and the status of the data units may equal on one of Modified (M), Extended (E), Shared (S), or Invalid (I) state. In one embodiment, if the display data unit stored in the memory 480 may be referred to as MDDU if the status of that DDU equals M (modified) state.

In one embodiment, the cache control logic 440 may receive a query, which may comprise the annotation value and the data unit identifier stored, respectively, in the annotation value field and the data unit identifier field. In one embodiment, the cache control logic 440 may send the annotation value to the annotation comparator 460 and the data unit identifier to the cache line selector 470, which may be used to select a cache line comprising the data unit identified by the data unit identifier. In one embodiment, the cache control logic 440 may receive a true signal from the annotation comparator 460 if the annotation value provided by the cache control logic 440 matches with the annotation value of the selected cache line. In one embodiment, the cache control logic 440 may retrieve the status information stored in the status field of the selected cache line. In one embodiment, the cache control logic 440 may generate a response using the status information retrieved from the selected cache line and send the response to the GAU 142.

After sending the response, in one embodiment, the cache control logic 440 may receive flush commands from the GAU 142, which may comprise the identifiers of the display data units. In one embodiment, the cache control logic 440 may use the identifiers of the display data units embedded in the flush commands to flush such DDUs to the main memory 190.

In one embodiment, the cache line selector 470 may receive the data unit identifier from the cache control logic 440 and may select the cache line comprising the data unit identified by the data unit identifier. In one embodiment, the cache line selector 470 may compare the data unit identifier provided by the cache control logic 440 and the content of the data identifier field of the memory 480. In one embodiment, the cache line selector 470 may, simultaneously, perform the comparison of the contents of the data unit identifier fields with the data unit identifier provided by the cache control logic 440. In one embodiment, the cache line selector 470 may select a cache line comprising a data unit identifier that matches with the data unit identifier provided by the cache control logic 440. In one embodiment, the query may comprise a plurality of identifiers and the cache line selector 470 may select one or more cache lines, which may match the data unit identifiers in the query.

In one embodiment, the annotation comparator 460 may use the cache line selection event to identify the cache line from which the annotation value is to be retrieved for comparison. In one embodiment, the annotation comparator 460 may compare the annotation value received from the cache control logic 440 with the annotation value retrieved from the selected cache line of the memory 480. In one embodiment, the annotation comparator 460 may generate a true signal if the two annotation values are equal and may generate a false signal if the two annotation values are not equal. In one embodiment, the annotation comparator may compare the annotation value of the one or more selected cache lines with the annotation value received from the cache control logic 440.

A line diagram depicting the operation of the GAU 142, LLC 130, and the main memory 190 to ensure coherency between the graphics domain 140 and the display domain 160 is illustrated in FIG. 5.

In one embodiment, the GAU 142, as indicated in block 230 of FIG. 2, may flush data units DDU 510-1, 510-2, and 510-n and ODU 520-1 and 520-2 to the LLC 130 after annotating the data units. In one embodiment, as indicated in block 220 of FIG. 2, the annotation value associated with DDUs 510-1 to 510-n may equal first annotation value (FAV) and the annotation value associated with ODUs 520-1 and 520-2 may equal second annotation value (SAV). In one embodiment, the FAV may equal a first two bit value (01) and the SAV may equal a second two bit value (10) as depicted in the annotation value field of the memory 480. In one embodiment, the LLC 130, as indicated in block 250, may store the DDUs 510-1 to 520-n in the ways of the cache lines of the memory 480. In one embodiment, the event of storing the DDUs 510-1 to 510-n may be indicated by 531-1, 531-4, and 531-n. In one embodiment, the LLC 130 may store the ODUs 520-1 to 520-2 in the ways of the cache lines of the memory 480. In one embodiment, the event of storing the ODUs 520-1 to 520-n may be indicated by 531-2, and 531-3.

Figure 4:
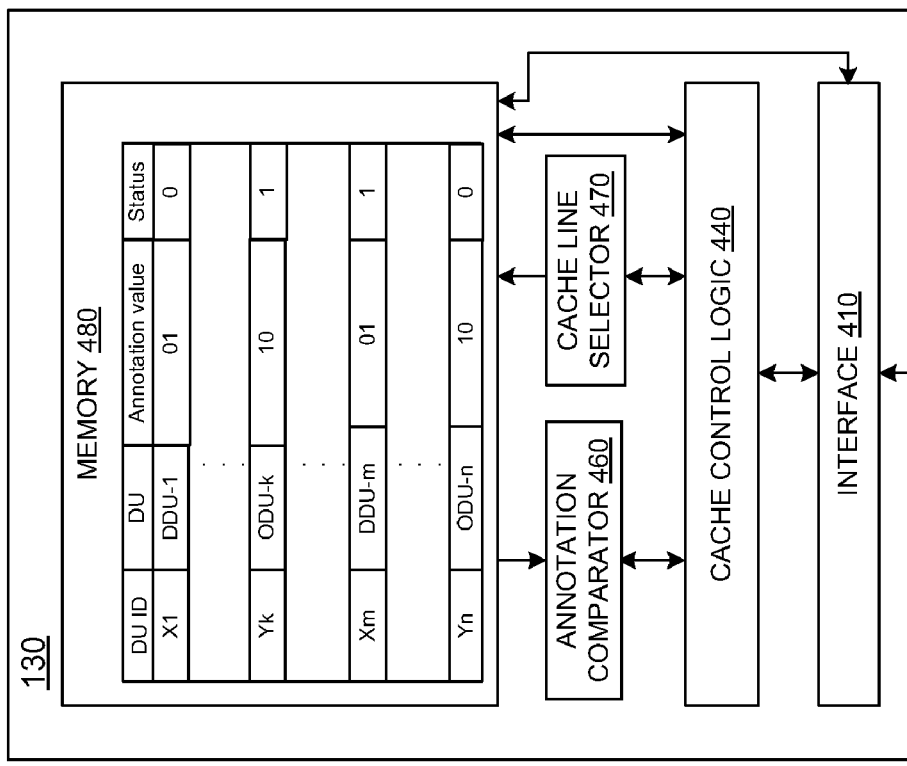
FIG. 4 illustrates a last level cache 130, which is to support identifying display data units that may be transferred to the main memory according to one embodiment.

In one embodiment, the GAU 142 may generate a query 550 and send the query to the LLC 130. In one embodiment, the query 550 may comprise data unit identifiers id510-1, id510-2, and id510-n, id520-1, and id520-2 associated with annotation value (AV) FAV, FAV, FAV, FAV, and FAV, respectively. In one embodiment, the LLC 130 may process the Query 550 and generate a response 570 and the event is indicated by event 560. In one embodiment, the response 570 may comprise status information for each of the data unit identifiers in the query. In one embodiment, the response 570 may comprise SI-510-1, SI-510-2, SI-510-n, SI-520-1, and SI-520-2, which may indicate the status of the data unit identified by the data unit identifier of the query. In one embodiment, the status information may comprise a single bit value (logic 0 or 1) as depicted in status field of the memory 480 of FIG. 4. In one embodiment, the data unit may represent a modified data unit if the status information bit equals logic 1 and may represent an unmodified data unit if the status information bit equals logic 0. In one embodiment, the response status may comprise a single bit value (logic 0 or 1), which may be set to logic 1 if the identified data units annotation value matches the annotation value of the query indicating that the cache line is modified and the bit value may be set to logic 0 otherwise In one embodiment, the GAU 142 may receive the response 570 and identify the MDDUs in an event 580. In one embodiment, the GAU 142 may generate flush commands 590-1 and 590-2 that may be issued to the LLC 130 and the LLC 130 may flush the MDDUs identified by the flush commands to the main memory 190. In one embodiment, the flushing of MDDUs by flush commands 590-1 and 590-2 are represented by 595-1 and 595-2, respectively.

Referring to FIG. 6, a computer system 600 may include a general purpose processor 602 including a single instruction multiple data (SIMD) processor and a graphics processor unit (GPU) 605. The processor 602, in one embodiment, may perform enhancement operations in addition to performing various other tasks or store a sequence of instructions, to provide enhancement operations in a machine readable storage medium 625. However, the sequence of instructions may also be stored in the memory 620 or in any other suitable storage medium.

While a separate graphics processor unit 605 is depicted in FIG. 6, in some embodiments, the graphics processor unit 605 may be used to perform enhancement operations, as another example. The processor 602 that operates the computer system 600 may be one or more processor cores coupled to logic 630. The logic 630 may be coupled to one or more I/O devices 660, which may provide interface the computer system 600. The logic 630, for example, could be chipset logic in one embodiment. The logic 630 is coupled to the memory 620, which can be any kind of storage, including optical, magnetic, or semiconductor storage. The graphics processor unit 605 is coupled through a frame buffer to a display 640.

In one embodiment, the graphics processor unit 605 may generate data units after processing an application and the data units may be annotated to generate display data units. In one embodiment, the graphics processor unit 605 may flush the annotated data units to a last level cache 608, which may maintain the annotation values associated with the annotated data units while storing the annotated data values. In one embodiment, the graphics processor 605 may send a query to the last level cache 608 to identify the annotated data units, which are also modified. In one embodiment, the last level cache 608 may respond to the query by sending a response, which may comprise status information to indicate if the annotated data unit is modified. In one embodiment, the graphics processor 605 may cause such modified annotated data units to be be flushed from the last level cache 608 to the memory 620.

In one embodiment, the display engine 610 may retrieve the data units from the memory 620 and may cause the data units to be rendered on the display 640. In one embodiment, the display engine 610 may not snoop the on-die caches such as the cache 606 and the last level cache 608. However, the graphics processor 605 may flush the data units, which may be required for display compared to flushing the entire contents of the on-die caches. An approach to identify the type of the data units and discriminately flushing such data units may conserve resources such as the processing cycles, bus bandwidth, memory bandwidth, and power consumed in performing such tasks.

The coherency processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in the machine readable storage medium 625. The coherency processing techniques described herein may be used in various systems such as the mobile phone, personal digital assistants, mobile internet devices, and such other systems.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to ensure coherency in a computing system comprising:

generating a plurality of data units from an application, wherein the plurality of data units comprise display data units and other data units, annotating the display data units with a first annotation value before flushing the display data units to an on-die cache, annotating the other data units with a second annotation value before flushing the other data units to the on-die cache, identifying modified display data units among the data units stored in the on-die cache, flushing the modified display data units from the on-die cache to a main memory, and generating a display on a display device using the modified display data units stored in the main memory.

2. The method of claim 1, storing the display data units in the on-die cache further comprise, maintaining the annotation value of the display data units, and associating the display data units with status information, wherein the status information is to indicate whether the display data units are modified.

3. The method of claim 1 identifying the modified display data units further comprise, sending a query to the on-die cache, wherein the query includes identifiers of the data units that is to be checked and annotation values that is to be checked for, and receiving a response to the query, wherein the response includes the status information for the display data units identified by the identifiers and the annotation values that are included in the query.

4. The method of claim 3 further comprises, selecting cache lines comprising the display data units identified by the identifiers and matching the annotation value of the query, retrieving the status information of the display data units of the cache lines, and embedding the status information in the response before sending the response.

5. The method of claim 4 further comprises, retrieving the status information from the response, and determining that a display data unit of the display data units is a modified display data unit if the status information indicates that the display data unit is modified.

6. The method of claim 5, wherein the flush command comprises identifiers of the modified display data units.

7. The method of claim 1, wherein the flushing of modified display data units is performed based on the identifiers in the flush command.

8. A processor comprising, an interface, wherein the interface is to couple the graphics acceleration unit to an on-die cache, a graphics controller coupled to the interface, wherein the graphics controller is to generate a plurality of data units from an application, wherein the plurality of data units comprise display data units and other data units, an annotation block coupled to the graphics controller, wherein the annotation block is to annotate the display data units with a first annotation value before the graphics controller is to flush the display data units to the on-die cache and annotate the other data units with a second annotation value, wherein the graphics controller is to identify modified display data units among the data units stored in the on-die cache, and wherein the graphics controller is to flush the modified display data units from the on-die cache to a main memory.

9. The processor of claim 8 further comprises a query generation block coupled to the graphics controller, wherein the query generation block is to generate a query, wherein the query includes identifiers of the display data units that is to be checked and annotation values to be checked for.

10. The processor of claim 9 further comprises a response handling block coupled to the graphics controller, wherein the response handling block is to,
receive a response to the query,
identify the display data units that are modified based on status information for the data units included in the response, and
generate input values comprising the identifiers of the display data units that are modified.

11. The processor of claim 10, wherein the graphics controller is to generate flush commands using the input values, wherein the flush commands comprise identifiers of the display data units that are modified.

12. An on-die cache comprising,
an interface, wherein the interface is to couple the on-die cache to a graphics acceleration unit and a main memory,
a cache control logic coupled to the interface, wherein the cache control logic is to,
maintain annotation value of the data units while storing the data units in a memory,
associate the data units with status information, wherein the status information is to indicate whether the data units are modified,
generate a response to a query, wherein the response is to comprise status information of the display data units queried for in the query, and
flush the display data units to the main memory, wherein the flush operation is performed in response to receiving flush commands, wherein the display data units are identified by the identifiers of the flush commands,
a cache line selector coupled to the cache control logic, wherein the cache line selector is to select cache lines that comprise data units identified by identifiers of the query, and
an annotation block coupled to the cache control logic, wherein the annotation block is to, retrieve a first annotation values from the selected cache lines, compare the first annotation values with second annotation values included in the query, and send a true signal to the cache control logic if the first annotation values are equal to second annotation values and a false signal if the first annotation values are not equal to second annotation values.

13. The on-die cache of claim 12,
wherein the cache control logic is to retrieve the status information associated with the display data units of the selected cache lines in response to receiving the true signal.

14. The on-die cache of claim 13, wherein the cache control logic is to generate the response, wherein the response is to comprise the status information of the selected cache lines.

15. A system to ensure coherency comprising:
a graphics processor, wherein the graphics processor is to,
annotate the display data units with an annotation value before flushing the display data units to an on-die cache, wherein the graphics processor is to generate a plurality of data units from an application, wherein the plurality of data units comprise the display data units and other data units,
identify modified display data units among the data units stored in the on-die cache, and
issue flush commands to flush the modified display data units from the on-die cache to the main memory,
the on-die cache coupled to the graphics processor, wherein the on-die cache is to,
generate a response, wherein the response is to identify the modified display data units, and
flush the modified display data units from the on-die cache to a main memory,
a display engine coupled to the main memory, wherein the display engine is to generate display on a display device using the modified display data units stored in the main memory.

16. The system of claim 15 wherein the on-die cache is to maintain the annotation value of the data units while storing the data units in the on-die cache, and
associate the data units with status information, wherein the status information is to indicate whether the data units are modified.

17. The system of claim 15 the graphics processor further comprises a graphics controller, wherein the graphics controller is to,
send a query to the on-die cache, wherein the query includes identifiers of the data units that are to be checked and annotation values to be checked for, and
receive a response to the query, wherein the response includes the status information for the data units identified by the identifiers that are included in the query.

18. The system of claim 17 the graphics processor further comprises a query generation block coupled to the graphics controller, wherein the query generation block is to generate the query, wherein the query is to include identifiers of the data units that are to be checked and the annotation values to be checked for.

19. The system of claim 17 the on-die cache further comprises a cache control logic, wherein the cache control logic is to,
select cache lines comprising the display data units identified by the identifiers and annotation values of the query,
retrieve the status information of the display data units of the cache lines, and
embed the status information in the response before sending the response.

20. The system of claim 19 the graphics processor further comprises a response handling block, wherein the response handling block is to,
retrieve the status information from the response, and
determine that a display data unit of the display data units is a modified display data unit if the status information indicates that the display data unit is modified.

21. The system of claim 20, wherein the graphics controller is to generate flush commands that comprise identifiers of the modified display data units.

22. The system of claim 21, wherein the on-die cache is to flush the modified display data units using the identifiers in the flush command.

* * * * *